(12) United States Patent
Li (10) Patent No.: US 12,299,025 B2
(45) Date of Patent: May 13, 2025

(54) ENTRY RECOMMENDATION METHOD AND APPARATUS

(71) Applicant: BEIJING SOGOU TECHNOLOGY DEVELOPMENT CO., LTD., Beijing (CN)

(72) Inventor: Xin Li, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 46 days.

(21) Appl. No.: 18/165,069

(22) Filed: Feb. 6, 2023

(65) Prior Publication Data

US 2023/0185836 A1 Jun. 15, 2023

Related U.S. Application Data

(63) Continuation of application No. PCT/CN2021/102187, filed on Jun. 24, 2021.

(30) Foreign Application Priority Data

Nov. 27, 2020 (CN) .......................... 202011360947.5

(51) Int. Cl.
*G06F 16/335* (2019.01)
*G06F 16/33* (2019.01)
(Continued)

(52) U.S. Cl.
CPC ........ *G06F 16/335* (2019.01); *G06F 16/3344* (2019.01); *G06F 16/353* (2019.01)

(58) Field of Classification Search
CPC .............. G06F 16/335; G06F 16/3344; G06F 16/353; G06F 40/242; G06F 16/3334; G06F 40/274
See application file for complete search history.

(56) References Cited

U.S. PATENT DOCUMENTS

| 8,504,437 B1* | 8/2013 | Agarwal | ............. G06F 16/9535 |
| | | | 705/14.54 |
| 2008/0162109 A1* | 7/2008 | Strassner | .............. G06F 40/143 |
| | | | 703/2 |

(Continued)

FOREIGN PATENT DOCUMENTS

| CN | 107256239 A | 10/2017 |
| CN | 109669550 A | 4/2019 |

(Continued)

OTHER PUBLICATIONS

International Search Report for PCT/CN2021/102187 dated Sep. 24, 2021 [PCT/ISA/210].

*Primary Examiner* — Jared M Bibbee
(74) *Attorney, Agent, or Firm* — Sughrue Mion, PLLC (57) ABSTRACT

An apparatus and method for entry recommendation includes: recalling a plurality of vocabularies based on a multi-path recall policy, entries in each of the vocabularies having original scores; normalizing the original scores for the vocabulary to obtain target scores of the entries in the vocabulary; respectively determining weights of the entries in the vocabulary; selecting target entries from the plurality of vocabularies based on the target scores and the weights; and pushing the target entries to a target client.

20 Claims, 5 Drawing Sheets

(51) Int. Cl.
*G06F 16/334* (2025.01)
*G06F 16/35* (2019.01)
*G06F 16/353* (2025.01)

(56) References Cited

U.S. PATENT DOCUMENTS

| | | | | |
|---|---|---|---|---|
| 2010/0194690 | A1* | 8/2010 | Wilairat | G06F 3/0237 |
| | | | | 345/168 |
| 2014/0201180 | A1* | 7/2014 | Fatourechi | G06F 16/951 |
| | | | | 707/706 |
| 2015/0026192 | A1* | 1/2015 | Kamerman | G06F 16/335 |
| | | | | 707/748 |
| 2015/0039432 | A1* | 2/2015 | Rao | G06Q 30/0255 |
| | | | | 705/14.54 |
| 2016/0117329 | A1* | 4/2016 | Busey | G06F 16/9535 |
| | | | | 707/726 |
| 2016/0224662 | A1* | 8/2016 | King | G06N 20/00 |
| 2018/0218285 | A1* | 8/2018 | Oliner | G06N 5/04 |

FOREIGN PATENT DOCUMENTS

| | | | |
|---|---|---|---|
| CN | 110442796 | A | 11/2019 |
| CN | 111008278 | A | 4/2020 |
| CN | 111160023 | A | 5/2020 |
| CN | 111241388 | A | 6/2020 |
| CN | 111259232 | A | 6/2020 |
| CN | 111353836 | A | 6/2020 |

* cited by examiner

ENTRY RECOMMENDATION METHOD AND APPARATUS

CROSS REFERENCE TO RELATED APPLICATIONS

This application is a continuation of PCT/CN2021/102187 filed on Jun. 24, 2021 and claims priority to Chinese Patent Application No. 202011360947.5, filed with the China National Intellectual Property Administration on Nov. 27, 2020, the contents of each of which being incorporated by reference herein in their entireties.

FIELD

Embodiments of the disclosure relate to the field of computer technologies, and in particular, to an entry recommendation method and apparatus.

BACKGROUND

The input method client is configured with a system word library. The word library includes frequently used words of all users, some authoritative words some hot words, and the like. In the input process by the user, several words may be selected from the system word library as candidate items to be recommended to the user. However, with the continuous emergence of new entries and expressions, the difference in input demands of users is increasingly larger, resulting in that some personalized high-frequency entries of users cannot be selected for the system word library. Therefore, the system word library cannot meet the input demands of users.

In the prior art, a single or multi-path recall policy is used to recall an entry for a certain user, and the recalled entry is directly aggregated into a vocabulary and recommended to the user.

SUMMARY

Embodiments of the disclosure provide an entry recommendation method and apparatus and an apparatus for recommending an entry, so as to solve the technical problems that entries recommended to users in the prior art cannot satisfy input demands of the users and the accuracy is relatively low.

According to an aspect of one or more embodiments, there is provided a method for an entry recommendation method, the method including: recalling a plurality of vocabularies based on a multi-path recall policy, entries in each of the vocabularies having original scores; normalizing the original scores for the vocabulary to obtain target scores of the entries in the vocabulary; respectively determining weights of the entries in the vocabulary; selecting target entries from the plurality of vocabularies based on the target scores and the weights; and pushing the target entries to a target client.

According to other aspects of one or more embodiments, there is also provided an apparatus and non-transitory computer readable medium consistent with the method.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

DESCRIPTION OF EMBODIMENTS

The disclosure is further described in detail below with reference to the accompanying drawings and embodiments. It may be understood that, the specific embodiments described herein are merely used for illustrating a related invention, but not to limit the invention. In addition, for ease of description, the accompanying drawings only show parts relevant to the related invention.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with the disclosure. Instead, they are merely examples of apparatuses and methods consistent with some aspects of the disclosure as recited in the appended claims.

The embodiments in the disclosure and features in the embodiments may be combined with each other in a case that no conflict occurs. The disclosure is described in detail below with reference to the accompanying drawings and the embodiments.

According to a first aspect, an embodiment of the disclosure provides an entry recommendation method. The method includes: recalling a plurality of vocabularies based on a multi-path recall policy, entries in each of the vocabularies having original scores; normalizing the original scores for the vocabulary to obtain target scores of the entries in the vocabulary, and respectively determining weights of the entries in the vocabulary; and selecting target entries from the plurality of vocabularies based on the target scores and the weights, and pushing the target entries to a target client.

In some embodiments, the respectively determining weights of the entries in the vocabulary includes: grouping the entries in the vocabulary based on the original scores; and determining a weight of each group of entries, a same group of entries having the same weight.

In some embodiments, the selecting target entries from the plurality of vocabularies based on the target scores and the weights includes: performing weighted summation on the target score of each of recalled entries based on the weights, to obtain a weighted score of the recalled entry; sorting the recalled entries in descending order of the weighted scores; and selecting a preset number of entries as the target entries based on a sorting result.

In some embodiments, the pushing the target entries to a target client includes: aggregating the target entries to obtain a target vocabulary; and using, as a target user, a user at which the multi-path recall policy is targeted, and pushing the target entries to a target client used by the target user.

In some embodiments, the normalizing the original scores for the vocabulary to obtain target scores of the entries in the vocabulary includes: normalizing, for the recalled vocabulary, the original scores of the entries in the vocabulary based on a minimum value and a maximum value of the original scores of the entries in the vocabulary, to obtain the target scores of the entries in the vocabulary.

In some embodiments, the normalizing, for the recalled vocabulary, the original scores of the entries in the vocabulary based on the minimum value and the maximum value of the original scores of the entries in the vocabulary, to obtain the target scores of the entries in the vocabulary includes: determining, for the recalled vocabulary, the minimum value and the maximum value of the original scores of the entries in the vocabulary; and determining, for each entry in the vocabulary, a first difference between the original score of the entry and the minimum value, determining a second difference between the maximum value and the minimum value, and determining a ratio of the first difference to the second difference as the target score of the entry.

In some embodiments, the normalizing, for the recalled vocabulary, the original scores of the entries in the vocabulary based on the minimum value and the maximum value of the original scores of the entries in the vocabulary, to obtain the target scores of the entries in the vocabulary includes: determining, for the recalled vocabulary, the minimum value and the maximum value of the original scores of the entries in the vocabulary, using a sum of the minimum value and a preset deviation value as a first target value, and using a difference between the maximum value and the preset deviation value as a second target value; and determining, for each entry in the vocabulary, a first difference between the original score of the entry and the first target value, determining a second difference between the second target value and the first target value, and determining a ratio of the first difference to the second difference as the target score of the entry.

According to a second aspect, an embodiment of this application provides an entry recommendation apparatus, the apparatus including: a recall unit, configured to recall a plurality of vocabularies based on a multi-path recall policy, entries in each of the vocabularies having original scores; a processing unit, configured to normalize the original scores for the vocabulary to obtain target scores of the entries in the vocabulary, and respectively determine weights of the entries in the vocabulary; and a push unit, configured to select target entries from the plurality of vocabularies based on the target scores and the weights, and push the target entries to a target client.

In some embodiments, the processing unit is further configured to: group the entries in the vocabulary based on the original scores; and determine a weight of each group of entries, a same group of entries having the same weight.

In some embodiments, the push unit is further configured to: perform weighted summation on the target score of each of recalled entries based on the weights, to obtain a weighted score of the recalled entry; sort the recalled entries in descending order of the weighted scores; and select a preset number of entries as the target entries based on a sorting result.

In some embodiments, the push unit is further configured to: aggregate the target entries to obtain a target vocabulary; and use, as a target user, a user at which the multi-path recall policy is targeted, and push the target entries to a target client used by the target user.

In some embodiments, the processing unit is further configured to: normalize, for the recalled vocabulary, the original scores of the entries in the vocabulary based on a minimum value and a maximum value of the original scores of the entries in the vocabulary, to obtain the target scores of the entries in the vocabulary.

In some embodiments, the processing unit is further configured to: determine, for the recalled vocabulary, the minimum value and the maximum value of the original scores of the entries in the vocabulary; and determine, for each entry in the vocabulary, a first difference between the original score of the entry and the minimum value, determine a second difference between the maximum value and the minimum value, and determine a ratio of the first difference to the second difference as the target score of the entry.

In some embodiments, the processing unit is further configured to: determine, for the recalled vocabulary, the minimum value and the maximum value of the original scores of the entries in the vocabulary, use a sum of the minimum value and a preset deviation value as a first target value, and use a difference between the maximum value and the preset deviation value as a second target value; and determine, for each entry in the vocabulary, a first difference between the original score of the entry and the first target value, determine a second difference between the second target value and the first target value, and determine a ratio of the first difference to the second difference as the target score of the entry.

According to a third aspect, an embodiment of the disclosure provides an apparatus for recommending an entry, the apparatus including a memory and one or more programs, the one or more programs being stored in the memory, configured to be executed by one or more processors, and including instructions used for performing the following operations: recalling a plurality of vocabularies based on a multi-path recall policy, entries in each of the vocabularies having original scores; normalizing the original scores for the vocabulary to obtain target scores of the entries in the vocabulary, and respectively determining weights of the entries in the vocabulary; and selecting target entries from the plurality of vocabularies based on the target scores and the weights, and pushing the target entries to a target client.

In some embodiments, the respectively determining weights of the entries in the vocabulary includes: grouping the entries in the vocabulary based on the original scores; and determining a weight of each group of entries, a same group of entries having the same weight.

In some embodiments, the selecting target entries from the plurality of vocabularies based on the target scores and the weights includes: performing weighted summation on the target score of each of recalled entries based on the weights, to obtain a weighted score of the recalled entry; sorting the recalled entries in descending order of the weighted scores; and selecting a preset number of entries as the target entries based on a sorting result.

In some embodiments, the pushing the target entries to a target client includes: aggregating the target entries to obtain a target vocabulary; and using, as a target user, a user at which the multi-path recall policy is targeted, and pushing the target entries to a target client used by the target user.

In some embodiments, the normalizing the original scores for the vocabulary to obtain target scores of the entries in the vocabulary includes: normalizing, for the recalled vocabulary, the original scores of the entries in the vocabulary based on a minimum value and a maximum value of the original scores of the entries in the vocabulary, to obtain the target scores of the entries in the vocabulary.

In some embodiments, the normalizing, for the recalled vocabulary, the original scores of the entries in the vocabulary based on the minimum value and the maximum value of the original scores of the entries in the vocabulary, to obtain the target scores of the entries in the vocabulary includes: determining, for the recalled vocabulary, the minimum value and the maximum value of the original scores of the entries in the vocabulary; and determining, for each entry in the vocabulary, a first difference between the original score of the entry and the minimum value, determining a second difference between the maximum value and the minimum value, and determining a ratio of the first difference to the second difference as the target score of the entry.

In some embodiments, the normalizing, for the recalled vocabulary, the original scores of the entries in the vocabulary based on the minimum value and the maximum value of the original scores of the entries in the vocabulary, to obtain the target scores of the entries in the vocabulary includes: determining, for the recalled vocabulary, the minimum value and the maximum value of the original scores of the entries in the vocabulary, using a sum of the minimum value and a preset deviation value as a first target value, and using a difference between the maximum value and the preset deviation value as a second target value; and determining, for each entry in the vocabulary, a first difference between the original score of the entry and the first target value, determining a second difference between the second target value and the first target value, and determining a ratio of the first difference to the second difference as the target score of the entry.

According to a fourth aspect, an embodiment of the disclosure provides a computer-readable medium, storing a computer program thereon, the computer program, when executed by a processor, implementing the method as described in the first aspect.

Figure 1:
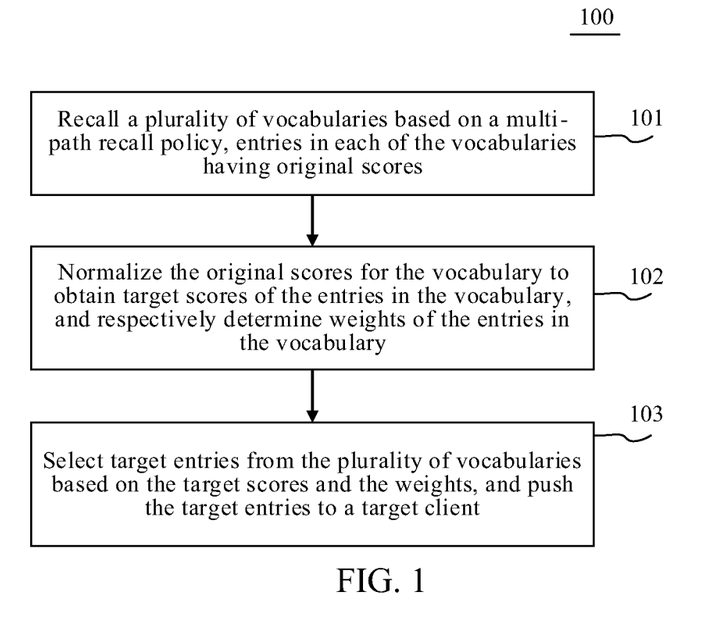
FIG. 1 is a flowchart of an entry recommendation method according to some embodiments.

According to entry recommendation method and apparatus and the apparatus for recommending an entry provided in the embodiments of this application, the plurality of vocabularies are recalled through the multi-path recall policy. Then the original scores of the entries are normalized for the vocabulary to obtain target scores of the entries in the vocabulary, and the weights of the entries in the vocabulary are respectively determined. Finally, the target entries are selected based on the target scores and the weights, and the target entries are pushed to the target client. On the one hand, since more abundant entries may be recalled through the multi-path recall policy, the recalled entries may satisfy the input demands of the user to a higher degree. On the other hand, the processing based on normalization and weights may enable the entries in different vocabularies to be comparable, thereby selecting the target entries from the recalled vocabularies, which may improve the accuracy of the target entries recommended to the users FIG. 1 shows a process 100 of an embodiment of an entry recommendation method according to the disclosure. The entry recommendation method may be run on various electronic devices. The electronic devices include but are not limited to a server, a smart phone, a tablet computer, an e-book reader, a Moving Picture Experts Group Audio Layer III (MP3) player, a Moving Picture Experts Group Audio Layer IV (MP4) player, a laptop computer, an on-board computer, a desktop computer, a set top box, a smart TV, a wearable device, and the like.

The input method application mentioned in the embodiment of the application may support various input methods. The input method may be a coding method used to input various symbols into electronic devices such as a computer and a mobile phone, and users may use the input method application to conveniently input required characters or character strings into the electronic devices. In the embodiments of the disclosure, the input method not only supports common Chinese input methods (such as a Pinyin input method, a five strokes input method, a phonetic input method, a speech input method, a handwriting input method, and the like), but also supports other language input methods (such as an English input method, a Japanese hiragana input method, a Korean input method, and the like). No limitation is imposed on the input methods and language types of the input methods herein.

The entry recommendation method in this embodiment may include the following operations.

Operation 101: Recall a plurality of vocabularies based on a multi-path recall policy, entries in each of the vocabularies having original scores.

In this embodiment, the entry recommendation method may be performed by an execution body (such as the above electronic device) to recall the plurality of vocabularies based on the multi-path recall policy. The multi-path recall policy may mean a plurality of different recall policies. The multi-path recall policy may include, but is not limited to, at least one of the following: a topic-based recall policy, a tree-based deep match (TDM) model-based recall policy, a word vector-based recall policy, a location-based recall policy, a client-based recall policy, and other existing recall policies that may be applied to entry recall, and the like.

One vocabulary may be recalled through each recall policy, and each vocabulary may include a large number of entries. Different vocabularies may include the same entry and different entries. The entries in different vocabularies are independent of each other. For example, entries such as "jacket", "skiing", and "skier" may be recalled through the TDM model-based recall policy. Entries such as "skating", "snow sports", and "Beijing B skiing" may be recalled through the word vector-based recall policy. Entries such as "learning to ski", "skier", and "skiing for fun" may be recalled through the client-based recall policy. "Beijing Ski Resort A", "Beijing Ski Resort B", and "Beijing Ski Resort C" may be recalled through the location-based recall policy.

In this embodiment, entries in each of the recalled vocabularies may have original scores. The original scores are scores calculated during the implementation of the recall policy. Since different vocabularies are recalled based on different recall policies, the scores of entries in the vocabulary are independent of each other and are incomparable.

For example, scores of the entries such as "jacket", "skiing", and "skier" recalled through the TDM model-based recall policy are respectively 1.8, 1.7, and 1.5. Scores of the entries such as "skating", "snow sports", and "Beijing B skiing" recalled through the word vector-based recall policy are respectively 2.7, 2.6, and 2.5. Scores of the entries such as "learning to ski", "skier", and "skiing for fun" recalled through the client-based recall policy are respectively 3.7, 3.6, and 3.4. Scores of the entries such as "Beijing Ski Resort A", "Beijing Ski Resort B", and "Beijing Ski Resort C" recalled through the location-based recall policy are respectively 4.6, 4.5, and 4.4. It may be seen that the score of "skier" is 1.5 in the vocabulary recalled through the TDM model-based recall policy, and is 3.6 in the vocabulary recalled by the client-based recall policy, which are independent of each other.

Operation 102: Normalize the original scores for the vocabulary to obtain target scores of the entries in the vocabulary, and respectively determine weights of the entries in the vocabulary.

In this embodiment, for the recalled vocabulary, the execution body may normalize original scores of the entries in the vocabulary, to obtain the target scores of the entries in the vocabulary. The normalization process herein may mean a data processing method in which numeric conversion is performed on the original scores so that the converted values fall within a target value range (such as [0,1]). The original scores of the entries in the vocabulary are normalized, so that the target scores of entries in different vocabularies are distributed in the same value range, and the original non-comparable vocabularies are comparable, so as to facilitate the selection of target entries.

In this embodiment, for the recalled vocabulary, the execution body may further set weights for the entries in the recalled vocabulary. As an example, for the recalled vocabulary, the execution body may sort the entries in the vocabulary in descending order of the original scores. Then, the entries in the vocabulary may be grouped based on a sorting result, and a number of entries in each group may be the same or different. Finally, weights may be set for each group of entries. The weights of the same group of entries are the same, but the weights of different groups of entries are different, and the weights are positively correlated with an average score of each group of vocabularies.

For example, each vocabulary contains 60,000 entries. For the vocabulary, every 20,000 entries may be divided into one group according to the sorting result, and the entries in the vocabulary are respectively divided into three groups. Each group of entries in the vocabulary have the same weight. For example, the weights of the group of entries in the vocabulary recalled through the TDM model-based recall policy are successively 0.7, 0.5, and 0.4. The weights of the group of entries in the vocabulary recalled through the word vector-based recall policy are successively 0.6, 0.5, and 0.3. The weights of the group of entries in the vocabulary recalled through the client-based recall policy are successively 0.4, 0.2, and 0.1. The weights of the group of entries in the vocabulary recalled through the location-based recall policy are successively 0.4, 0.3, and 0.1.

The weights of each group of entries recalled through various recall policies may be preset based on statistics collected on a large amount of data, and weight values of each group of entries are not specifically limited herein. In addition, in addition to setting weights by grouping, the weights may be further set by adopting other weight setting rules as required. For example, the same weight is set for the entries in the same vocabulary, and the details are not described herein again.

In some optional implementations in this embodiment, for the recalled vocabulary, the execution body may normalize original scores of the entries in the vocabulary based on the minimum value and the maximum value of the original scores of the entries in the vocabulary, to obtain the target scores of the entries in the vocabulary.

As an example, for the recalled vocabulary, the execution body may first determine the minimum value (which may be denoted as min) and the maximum value (which may be denoted as max) of the original scores of the entries in the vocabulary. Then for each entry in the vocabulary, a first difference between the original score (which may be denoted as x) of the entry and the minimum value is determined, a second difference between the maximum value and the minimum value is determined, and a ratio of the first difference to the second difference is determined as the target score (which may be denoted as x') of the entry. Refer to the following formula:

$$x' = \frac{x - \min}{\max - \min}$$

As another example, the execution body may first determine the minimum value (which may be denoted as min) and the maximum value (which may be denoted as max) of the original scores of the entries in the vocabulary. Then a sum of the minimum value and a preset deviation value (which may be denoted as bias) is used as a first target value (that is, min+bias), and a difference between the maximum value and the preset deviation value is used as a second target value (that is, max-bias). Then for each entry in the vocabulary, a first difference between the original score (which may be denoted as x) of the entry and the first target value is determined, a second difference between the second target value and the first target value is determined, and a ratio of the first difference to the second difference is determined as the target score (which may be denoted as x') of the entry. By introducing the preset deviation value, the target score may be prevented from being 0 or 1, so that the normalized result falls within the value range (0,1). Refer to the following formula:

$$x' = \frac{x - (\min + \text{bias})}{(\max - \text{bias}) - (\min + \text{bias})}$$

In addition to the above normalization methods, other normalization methods may be further used for normalizing the original scores of each vocabulary, to obtain target scores of the entries in the vocabulary, and the details are not described herein again.

Operation 103: Select target entries from the plurality of vocabularies based on the target scores and the weights, and push the target entries to a target client.

In this embodiment, the execution body may select the target entries from the plurality of vocabularies through weighted calculation or weighted summation based on the target scores and the weights, and push the selected target entries to the target client. The target client may be a client used by a target user, and the target user may be the user at which the multi-path recall policy is targeted.

As an example, since each entry in each vocabulary has a target score and a weight, the execution body may first perform weighted calculation on the target score of the entry in the vocabulary based on the weights to obtain a weighted score. Then, the target entries may be selected from the plurality of vocabularies based on the weighted score. For example, entries that satisfy preset conditions (for example, the weighted score is greater than a certain preset threshold) may be selected from each vocabulary as the target entries, or a fixed number of entries with higher weighted scores may be selected from each vocabulary as the target entries.

Figure 2:
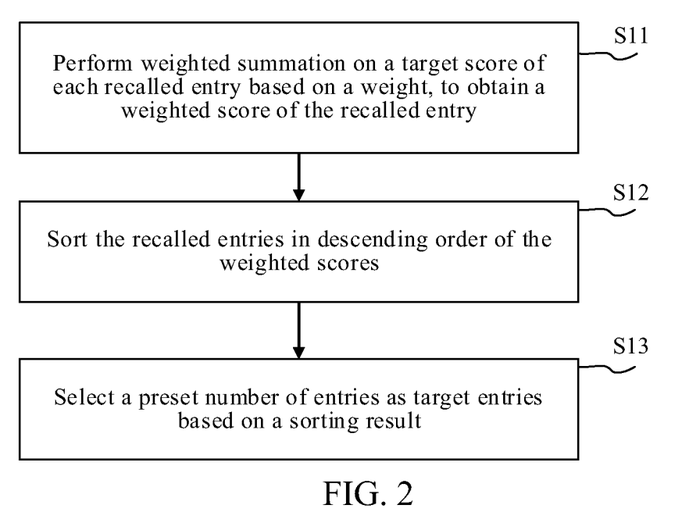
FIG. 2 is a flowchart of operations of selecting target entries based on target scores and weights in the entry recommendation method according to some embodiments.

In some embodiments, referring to FIG. 2, the execution body may select the target entries according to the following sub operations.

Sub operation S11: Perform weighted summation on the target score of each of recalled entries based on the weights, to obtain a weighted score of the recalled entry.

Each entry herein may have at least one target score and a corresponding weight. When the same entry appears in at least two vocabularies, the entry has at least two target scores and corresponding weights. The execution body may process each entry in the recalled vocabulary by weighted summation, and use the weighted result as the weighted score of the entry. Therefore, the weighted score of each entry is merged with the target score in each vocabulary to which the entry belongs, and therefore the recall result from the multi-path recall policy may be merged and compared, so that the entry recommended to the user may be more accurate and more consistent with the input preference of the user.

As an example, entries "jacket", "skiing", and "skier" may be recalled through the TDM model-based recall policy, and the target scores of the entries "jacket", "skiing", and "skier" are successively 0.9, 0.66, and 0.1, and the weights are successively 0.7, 0.7, and 0.7.

Entries "skating", "snow sports", and "Beijing B skiing" may be recalled through the word vector-based recall policy, and the target scores of the entries "skating", "snow sports", and "Beijing B skiing" are successively 0.9, 0.5, and 0.1, and the weights are successively 0.6, 0.6, and 0.6.

As an example, entries "learning to ski", "skier", and "skiing for fun" may be recalled through the client-based recall policy, and the target scores of the entries "learning to ski", "skier", and "skiing for fun" are successively 0.9, 0.66, and 0.1, and the weights are successively 0.4, 0.4, and 0.4.

Entries "Beijing Ski Resort A", "Beijing Ski Resort B", and "Beijing Ski Resort C" may be recalled through the location-based recall policy, and the target scores of the entries "Beijing Ski Resort A", "Beijing Ski Resort B", and "Beijing Ski Resort C" are successively 0.9, 0.5, and 0.1, and the weights are successively 0.4, 0.4, and 0.1.

Weighted summation is performed on the target score of each of the recalled entries based on the weights, to obtain the following weighted scores: the weighted score of "jacket" is 0.9*0.7=0.63; the weighted score of "skiing" is 0.66*0.7=0.46; the weighted score of "skier" is 0.1*0.7+0.66*0.4=0.33; the weighted score of "skating" is 0.9*0.6=0.54; the weighted score of "snow sports" is 0.5*0.6=0.3; the weighted score of "Beijing B skiing" is 0.1*0.6+0.5*0.4=0.26; the weighted score of "learning to ski" is 0.9*0.4=0.36; the weighted score of "skiing for fun" is 0.1*0.4=0.04; the weighted score of "Beijing Ski Resort A" is 0.9*0.4=0.36; and the weighted score of "Beijing Ski Resort C" is 0.1*0.1=0.01.

Sub operation S12: Sort the recalled entries in descending order of the weighted scores.

Each of the recalled entries herein has a weighted score. Since a normalized target score of the entry in a vocabulary to which the entry belongs is merged into the weighted score, a recall result from the multi-path recall policy is merged, thereby implementing merged sorting of the entries recalled based on the multi-path recall policy, and improving the accuracy of a sorting result of the entries.

Sub operation S13: Select a preset number of (such as 60,000) entries as the target entries based on the sorting result.

Since the selected target entry is the entry with the top sorting result, that is, an entry with a higher weighted score, the accuracy of the target entry recommended to the user may be improved.

In some embodiments, when the target entries are pushed to the target client, the target entries may be aggregated first to obtain the target vocabulary. Then the user at which the multi-path recall policy is targeted is used as a target user, and the target entries are pushed to a target client used by the target user. Therefore, the target vocabulary for the target users may be configured in the target client on the basis of the system vocabulary and the cell vocabulary, and the vocabulary may be obtained by performing merged sorting on the entries recalled through the multi-path recall policy, thereby improving the satisfaction degree and accuracy of the target entries recommended to users.

In the prior art, a single or multi-path recall policy is used to recall a vocabulary for a certain user, so as to satisfy the input preference of the user. The vocabulary recalled by using a single recall policy cannot accurately satisfy the input demands of the user, and the vocabularies recalled by using the multi-path recall policy are incomparable. Therefore, it is impossible to screen out accurate entries from the vocabulary to be recommended to the user. According to the method provided in the above embodiments of the disclosure, the plurality of vocabularies are recalled through the multi-path recall policy. Then the original scores of the entries in the vocabularies are normalized to obtain target scores of the entries in the vocabularies, and the weights of the entries in the vocabularies are respectively determined. Finally, the target entries are selected based on the target scores and the weights, and the target entries are pushed to the target client. On the one hand, since more abundant entries may be recalled through the multi-path recall policy, the recalled entries may satisfy the input demands of the user to a higher degree. On the other hand, the normalization processing may enable the entries in different vocabularies to be comparable, thereby selecting the target entries from the recalled vocabularies, which may improve the accuracy of the target entries recommended to the user.

Figure 3:
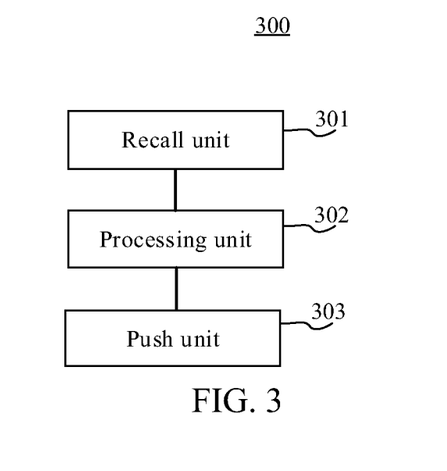
FIG. 3 is a schematic structural diagram of an entry recommendation apparatus according to some embodiments.

Further referring to FIG. 3, as the implementation of the methods shown in the above figures, the disclosure provides an embodiment of the entry recommendation apparatus. The apparatus embodiment corresponds to the method embodiment shown in FIG. 1. The apparatus may be applied to various electronic devices.

As shown in FIG. 3, the entry recommendation apparatus 300 in this embodiment includes: a recall unit 301, configured to recall a plurality of vocabularies based on a multi-path recall policy, entries in each of the vocabularies having original scores; a processing unit 302, configured to normalize the original scores for the vocabulary to obtain target scores of the entries in the vocabulary, and respectively determine weights of the entries in the vocabulary; and a push unit 303, configured to select target entries from the plurality of vocabularies based on the target scores and the weights, and push the target entries to a target client.

In some embodiments, the processing unit 302 is further configured to: group the entries in the vocabulary based on the original scores, and predict a recall rate of each group of entries; and determine weights of the group of entries based on the recall rate of the group of entries.

In some embodiments, the push unit 303 is further configured to: perform weighted summation on the target score of each of the recalled entries based on the weights, to obtain a weighted score of the recalled entry; sort the recalled entries in descending order of the weighted scores; and select a preset number of entries as the target entries based on a sorting result.

In some embodiments, the push unit 303 is further configured to: aggregate the target entries to obtain a target vocabulary; and use, as a target user, a user at which the multi-path recall policy is targeted, and push the target entries to a target client used by the target user.

In some embodiments, the processing unit 302 is further configured to: normalize, for the recalled vocabulary, the original scores of the entries in the vocabulary based on a minimum value and a maximum value of the original scores of the entries in the vocabulary, to obtain the target scores of the entries in the vocabulary.

In some embodiments, the processing unit 302 is further configured to: determine, for the recalled vocabulary, the minimum value and the maximum value of the original scores of the entries in the vocabulary; and determine, for each entry in the vocabulary, a first difference between the original score of the entry and the minimum value, determine a second difference between the maximum value and the minimum value, and determine a ratio of the first difference to the second difference as the target score of the entry.

In some embodiments, the processing unit 302 is further configured to: determine, for the recalled vocabulary, the minimum value and the maximum value of the original scores of the entries in the vocabulary, use a sum of the minimum value and a preset deviation value as a first target value, and use a difference between the maximum value and the preset deviation value as a second target value; and determine, for each entry in the vocabulary, a first difference between the original score of the entry and the first target value, determine a second difference between the second target value and the first target value, and determine a ratio of the first difference to the second difference as the target score of the entry.

According to the apparatus provided in the above embodiments of the disclosure, the plurality of vocabularies are recalled through the multi-path recall policy. Then the original scores of the entries in the vocabularies are normalized to obtain target scores of the entries in the vocabularies, and the weights of the entries in the vocabularies are respectively determined. Finally, the target entries are selected based on the target scores and the weights, and the target entries are pushed to the target client. On the one hand, since more abundant entries may be recalled through the multi-path recall policy, the recalled entries may satisfy the input demands of the user to a higher degree. On the other hand, the normalization processing may enable the entries in different vocabularies to be comparable, thereby selecting the target entries from the recalled vocabularies, which may improve the accuracy of the target entries recommended to the user.

Figure 4:
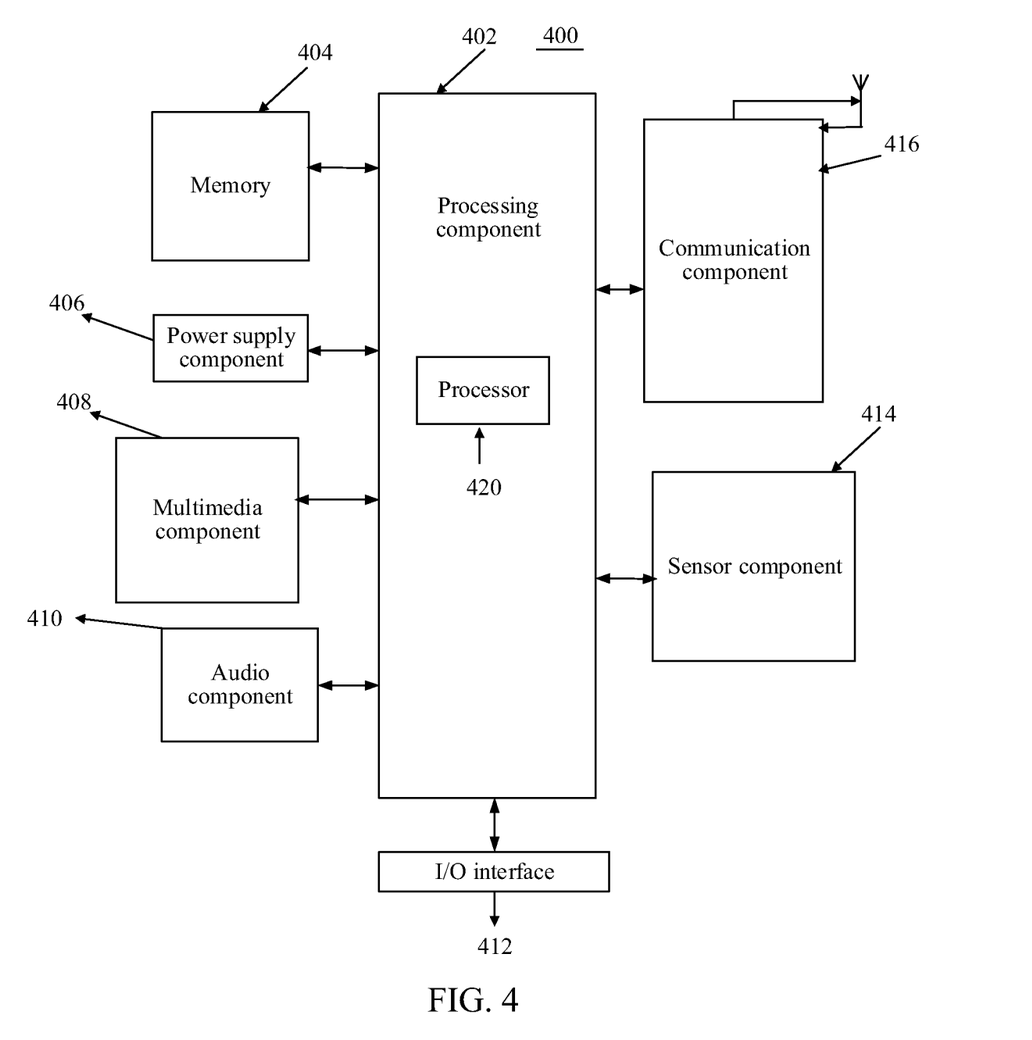
FIG. 4 is a schematic structural diagram of an apparatus for recommending an entry according to some embodiments.

FIG. 4 is a block diagram of an apparatus 400 for inputting according to an exemplary embodiment. The apparatus 400 may be an intelligent terminal or a server. For example, the apparatus 400 may be a mobile phone, a computer, a digital broadcasting terminal, a messaging device, a game console, a tablet device, a medical device, a fitness facility, a personal digital assistant, or the like.

Referring to FIG. 4, the apparatus 400 may include one or more of the following components: a processing component 402, a memory 404, a power supply component 406, a multimedia component 408, an audio component 410, an input/output (I/O) interface 412, a sensor component 414, and a communication component 416.

The processing component 402 controls the whole operation of the apparatus 400, such as operations associated with displaying, a phone call, data communication, a camera operation, and a recording operation. The processing component 402 may include one or more processors 420 to execute instructions, to complete all or some operations of the foregoing method. In addition, the processing component 402 may include one or more modules, to facilitate the interaction between the processing component 402 and other components. For example, the processing component 402 may include a multimedia module, to facilitate the interaction between the multimedia component 408 and the processing component 402.

The memory 404 is configured to store various types of data to support operations on the apparatus 400. Examples of the data include instructions, contact data, phonebook data, messages, pictures, videos, and the like of any application or method used for being operated on the apparatus 400. The memory 404 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

The power supply component 406 provides power to various components of the apparatus 400. The power supply component 406 may include a power supply management system, one or more power supplies, and other components associated with generating, managing, and allocating power for the apparatus 400.

The multimedia component 408 includes a screen providing an output interface between the apparatus 400 and a user. In some embodiments, the screen may include a liquid crystal display (LCD) and a touch panel (TP). If the screen includes the TP, the screen may be implemented as a touchscreen, to receive an input signal from the user. The TP includes one or more touch sensors to sense touching, sliding, and gestures on the TP. The touch sensor may not only sense a boundary of the touching or sliding operation, but also detect a duration and pressure related to the touching or sliding operation. In some embodiments, the multimedia component 408 includes a front camera and/or a rear camera. When the apparatus 400 is in an operation mode, such as a shooting mode or a video mode, the front camera and/or the rear camera may receive external multimedia data. Each front camera and rear camera may be a fixed optical lens system or have a focal length and an optical zooming capability.

The audio component 410 is configured to output and/or input an audio signal. For example, the audio component 410 includes a microphone (MIC), and when the apparatus 400 is in an operation mode, such as a call mode, a recording mode, and a speech recognition mode, the MIC is configured to receive an external audio signal. The received audio signal may be further stored in the memory 404 or transmitted through the communication component 416. In some embodiments, the audio component 410 further includes a loudspeaker configured to output an audio signal.

The I/O interface 412 provides an interface between the processing component 402 and a peripheral interface module. The peripheral interface module may be a keyboard, a click wheel, buttons, or the like. The buttons may include but are not limited to: a homepage button, a volume button, a start button, and a locking button.

The sensor component 414 includes one or more sensors configured to provide status evaluation in each aspect for the apparatus 400. For example, the sensor component 414 may detect an on/off state of the apparatus 400 and relative positioning of the component. For example, the component is a display and a small keyboard of the apparatus 400. The sensor component 414 may further detect a position change of the apparatus 400 or one component of the apparatus 400, existence or nonexistence of contact between the user and the apparatus 400, the azimuth or acceleration/deceleration of the apparatus 400, and a temperature change of the apparatus 400. The sensor component 414 may include a proximity sensor configured to detect existence of nearby objects without any physical contact. The sensor component 414 may further include an optical sensor, such as a CMOS or CCD image sensor, configured to be used in an imaging application. In some embodiments, the sensor component 414 may further include an acceleration sensor, a gyroscope sensor, a magnetic sensor, a pressure sensor, or a temperature sensor.

The communication component 416 is configured to facilitate communication in a wired or wireless manner between the apparatus 400 and other devices. The apparatus 400 may access a wireless network based on communication standards, such as Wi-Fi, 2G, or 3G, or a combination thereof. In an exemplary embodiment, the communication component 416 receives a broadcast signal or broadcast related information from an external broadcast management system via a broadcast channel. In an exemplary embodiment, the communication component 416 further includes a near field communication (NFC) module, to promote short range communication. For example, the NFC module may be implemented based on a radio frequency identification (RFID) technology, an infra-red data association (IrDA) technology, an ultra-wide band (UWB) technology, a Bluetooth (BT) technology, and other technologies.

In an exemplary embodiment, the apparatus 400 may be implemented by one or more application specific integrated circuits (ASIC), a digital signal processor (DSP), a digital signal processing device (DSPD), a programmable logic device (PLD), a field programmable gate array (FPGA), a controller, a micro-controller, a microprocessor, or other electronic elements, to perform the foregoing method.

In an exemplary embodiment, a non-transitory computer-readable storage medium including instructions, for example, a memory 404 including instructions, is further provided. The foregoing instructions may be executed by a processor 420 of the apparatus 400 to perform the foregoing method. For example, the non-transitory computer-readable storage medium may be a ROM, a RAM, a CD-ROM, a magnetic tape, a floppy disk, an optical data storage device, or the like.

Figure 5:
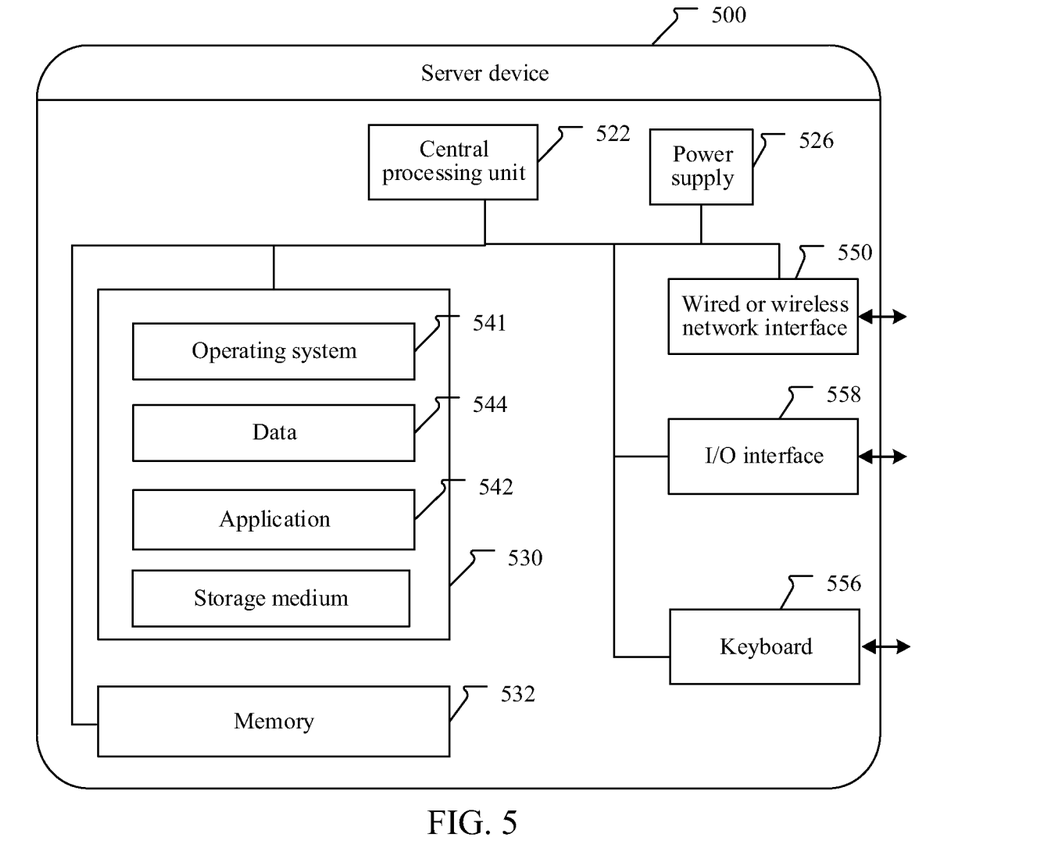
FIG. 5 is a schematic structural diagram of a server according to some embodiments.

FIG. 5 is a schematic structural diagram of a server according to some embodiments of the disclosure. The server 500 may vary greatly due to different configurations or performance, and may include one or more central processing units (CPU) 522 (for example, one or more processors) and a memory 532, and one or more storage media 530 (for example, one or more mass storage devices) storing an application 542 or data 544. The memory 532 and the storage medium 530 may be ephemeral storage or persistent storage. A program stored in the storage medium 530 may include one or more modules (not marked), and each module may include a series of instruction operations on the server. Further, the CPU 522 may be configured to communicate with the storage medium 530, and perform, on the server 500, a series of instructional operations in the storage medium 530.

The server 500 may further include one or more power supplies 526, one or more wired or wireless network interfaces 550, one or more input/output interfaces 558, one or more keyboards 556, and/or one or more operating systems 541, for example, Windows Server™, Mac OS X™, Unix™, Linux™, FreeBSD™, and the like.

When the instructions in the storage medium is executed by the processor of the apparatus (the intelligent terminal or server), the non-transitory computer-readable storage medium enables the apparatus to perform an entry recommendation method. The method includes: recalling a plurality of vocabularies based on a multi-path recall policy, entries in each of the vocabularies having original scores; normalizing the original scores for the vocabulary to obtain target scores of the entries in the vocabulary, and respectively determining weights of the entries in the vocabulary; and selecting target entries from the plurality of vocabularies based on the target scores and the weights, and pushing the target entries to a target client.

In some embodiments, the respectively determining weights of the entries in the vocabulary includes: grouping the entries in the vocabulary based on the original scores, and predicting a recall rate of each group of entries; and determining weights of the group of entries based on the recall rate of the group of entries.

In some embodiments, the selecting target entries from the plurality of vocabularies based on the target scores and the weights includes: performing weighted summation on the target score of each of recalled entries based on the weights, to obtain a weighted score of the recalled entry; sorting the recalled entries in descending order of the weighted scores; and selecting a preset number of entries as the target entries based on a sorting result.

In some embodiments, the pushing the target entries to a target client includes: aggregating the target entries to obtain a target vocabulary; and using, as a target user, a user at which the multi-path recall policy is targeted, and pushing the target entries to a target client used by the target user.

In some embodiments, the normalizing the original scores for the vocabulary to obtain target scores of the entries in the vocabulary includes: normalizing, for the recalled vocabulary, the original scores of the entries in the vocabulary based on a minimum value and a maximum value of the original scores of the entries in the vocabulary, to obtain the target scores of the entries in the vocabulary.

In some embodiments, the normalizing, for the recalled vocabulary, the original scores of the entries in the vocabulary based on the minimum value and the maximum value of the original scores of the entries in the vocabulary, to obtain the target scores of the entries in the vocabulary includes: determining, for the recalled vocabulary, the minimum value and the maximum value of the original scores of the entries in the vocabulary; and determining, for each entry in the vocabulary, a first difference between the original score of the entry and the minimum value, determining a second difference between the maximum value and the minimum value, and determining a ratio of the first difference to the second difference as the target score of the entry.

In some embodiments, the normalizing, for the recalled vocabulary, the original scores of the entries in the vocabulary based on the minimum value and the maximum value of the original scores of the entries in the vocabulary, to obtain the target scores of the entries in the vocabulary includes: determining, for the recalled vocabulary, the minimum value and the maximum value of the original scores of the entries in the vocabulary, using a sum of the minimum value and a preset deviation value as a first target value, and using a difference between the maximum value and the preset deviation value as a second target value; and determining, for each entry in the vocabulary, a first difference between the original score of the entry and the first target value, determining a second difference between the second target value and the first target value, and determining a ratio of the first difference to the second difference as the target score of the entry.

A person skilled in the art may easily figure out other implementations of the disclosure after considering the specification and practicing the application disclosed herein. The disclosure is intended to cover any variation, use, or adaptive change of the disclosure. These variations, uses, or adaptive changes follow the general principles of the disclosure and include common general knowledge or common technical means, which are not disclosed in the present disclosure, in the art. The specification and the embodiments are considered as merely exemplary, and the scope and spirit of the disclosure are indicated by the following claims.

It is to be understood that the disclosure is not limited to the precise structures described above and shown in the accompanying drawings, and various modifications and changes may be made without departing from the scope of the disclosure. The scope of the disclosure is subject only to the appended claims.

The foregoing descriptions are merely preferred embodiments of the disclosure, but are not intended to limit the disclosure. Any modification, equivalent replacement, or improvement made within the spirit and principle of the disclosure shall fall within the protection scope of the disclosure.

The entry recommendation method and apparatus and the apparatus for recommending an entry provided in the disclosure are described above in detail. Although the principles and implementations of the disclosure are described by using specific examples in this specification, the descriptions of the foregoing embodiments are merely intended to help understand the method and the core idea of the method of the disclosure. In addition, a person of ordinary skill in the art may make modifications to the specific implementations and application scope according to the idea of the disclosure. In conclusion, the content of this specification is not to be construed as a limitation on the disclosure.

What is claimed is:

1. An entry recommendation method, performed by at least one processor and comprising:
   recalling a plurality of vocabularies based on a multi-path recall policy, entries in each of the vocabularies having original scores;
   normalizing the original scores for the vocabulary to obtain target scores of the entries in the vocabulary;
   determining weights of the entries in the vocabulary respectively;
   selecting target entries from the plurality of vocabularies based on the target scores and the weights; and
   pushing the target entries to a target client,
   wherein the multi-path recall policy comprises:
      a first policy corresponding to a first vocabulary of the plurality of vocabularies, and
      a second policy corresponding to a second vocabulary of the plurality of vocabularies,
      wherein the first policy is a different type of policy from the second policy,
      wherein each entry of the first vocabulary dependent of each entry of the second vocabulary,
      wherein original scores of the first vocabulary are determined in accordance with the first policy, and
      wherein original scores of the second vocabulary are determined in accordance with the second policy.

2. The method according to claim 1, further comprising:
   grouping the entries in the vocabulary based on the original scores; and
   determining a weight of each group of entries, a same group of entries having the same weight.

3. The method according to claim 1, further comprising:
   performing weighted summation on the target score of each of the recalled entries based on the weights to obtain a weighted score of the recalled entry;
   sorting the recalled entries in descending order of the weighted scores; and
   selecting a preset number of entries as the target entries based on a sorting result.

4. The method according to claim 1, further comprising:
   aggregating the target entries to obtain a target vocabulary; and
   using, as a target user, a user at which the multi-path recall policy is targeted; and
   pushing the target entries to a target client used by the target user.

5. The method according to claim 1, further comprising:
   normalizing, for the recalled vocabulary, the original scores of the entries in the vocabulary based on a minimum value and a maximum value of the original scores of the entries in the vocabulary to obtain the target scores of the entries in the vocabulary.

6. The method according to claim 5, further comprising:
   determining, for the recalled vocabulary, the minimum value and the maximum value of the original scores of the entries in the vocabulary;
   determining, for each entry in the vocabulary, a first difference between the original score of the entry and the minimum value;
   determining a second difference between the maximum value and the minimum value; and
   determining a ratio of the first difference to the second difference as the target score of the entry.

7. The method according to claim 5, further comprising:
   determining, for the recalled vocabulary, the minimum value and the maximum value of the original scores of the entries in the vocabulary, using a sum of the minimum value and a preset deviation value as a first target value;
   using a difference between the maximum value and the preset deviation value as a second target value;
   determining, for each entry in the vocabulary, a first difference between the original score of the entry and the first target value;
   determining a second difference between the second target value and the first target value; and
   determining a ratio of the first difference to the second difference as the target score of the entry.

8. An entry recommendation apparatus, comprising:
   at least one memory configured to store program code; and
   at least one processor configured to read the program code and operate as instructed by the program code, the program code comprising:
   recall code, configured to cause the at least one processor to recall a plurality of vocabularies based on a multi-path recall policy, entries in each of the vocabularies having original scores;
   processing code, configured to cause the at least one processor to normalize the original scores for the vocabulary to obtain target scores of the entries in the vocabulary, and respectively determine weights of the entries in the vocabulary; and push code, configured to cause the at least one processor to select target entries from the plurality of vocabularies based on the target scores and the weights, and push the target entries to a target client,
wherein the multi-path recall policy comprises:
a first policy corresponding to a first vocabulary of the plurality of vocabularies, and
a second policy corresponding to a second vocabulary of the plurality of vocabularies,
wherein the first policy is a different type of policy from the second policy,
wherein each entry of the first vocabulary is independent of each entry of the second vocabulary,
wherein original scores of the first vocabulary are determined in accordance with the first policy, and
wherein original scores of the vocabulary are determined in accordance with the second policy.

9. The apparatus according to claim 8, wherein the processing code is configured to cause the at least one processor to:
group the entries in the vocabulary based on the original scores; and
determine a weight of each group of entries, a same group of entries having the same weight.

10. The apparatus according to claim 8, wherein the push code is configured to cause the at least one processor to:
perform weighted summation on the target score of each of the recalled entries based on the weights to obtain a weighted score of the recalled entry;
sort the recalled entries in descending order of the weighted scores; and
select a preset number of entries as the target entries based on a sorting result.

11. The apparatus according to claim 8, wherein the push code is configured to cause the at least one processor to:
aggregate the target entries to obtain a target vocabulary;
use, as a target user, a user at which the multi-path recall policy is targeted; and
push the target entries to a target client used by the target user.

12. The apparatus according to claim 8, wherein the processing code is configured to cause the at least one processor to:
normalize, for the recalled vocabulary, the original scores of the entries in the vocabulary based on a minimum value and a maximum value of the original scores of the entries in the vocabulary to obtain the target scores of the entries in the vocabulary.

13. The apparatus according to claim 12, wherein the processing code is configured to cause the at least one processor to:
determine, for the recalled vocabulary, the minimum value and the maximum value of the original scores of the entries in the vocabulary;
determine, for each entry in the vocabulary, a first difference between the original score of the entry and the minimum value;
determine a second difference between the maximum value and the minimum value; and
determine a ratio of the first difference to the second difference as the target score of the entry.

14. The apparatus according to claim 12, wherein the processing code is configured to cause the at least one processor to:
determine, for the recalled vocabulary, the minimum value and the maximum value of the original scores of the entries in the vocabulary;

use a sum of the minimum value and a preset deviation value as a first target value;
use a difference between the maximum value and the preset deviation value as a second target value;
determine, for each entry in the vocabulary, a first difference between the original score of the entry and the first target value;
determine a second difference between the second target value and the first target value; and
determine a ratio of the first difference to the second difference as the target score of the entry.

15. A non-transitory computer-readable storage medium, storing a computer program that when executed by at least one processor causes the at least one processor to:
recall a plurality of vocabularies based on a multi-path recall policy, entries in each of the vocabularies having original scores;
normalize the original scores for the vocabulary to obtain target scores of the entries in the vocabulary
respectively determine weights of the entries in the vocabulary;
select target entries from the plurality of vocabularies based on the target scores and the weights; and
push the target entries to a target client,
wherein the multi-path recall policy comprises:
a first policy corresponding to a first vocabulary of the plurality of vocabularies, and
a second policy corresponding to a second vocabulary of the plurality of vocabularies,
wherein the first policy is a different type of policy from the second policy,
wherein each entry of the first vocabulary is independent of each entry of the second vocabulary,
wherein original scores of the first vocabulary a determined in accordance with the first policy, and
wherein original scores of the second vocabulary are determined in accordance with the second policy.

16. The non-transitory computer-readable storage medium according to claim 15, wherein the program further causes the at least one processor to:
group the entries in the vocabulary based on the original scores; and
determine a weight of each group of entries, a same group of entries having the same weight.

17. The non-transitory computer-readable storage medium according to claim 15, wherein the program further causes the at least one processor to:
perform weighted summation on the target score of each of recalled entries based on the weights to obtain a weighted score of the recalled entry;
sort the recalled entries in descending order of the weighted scores; and
select a preset number of entries as the target entries based on a sorting result.

18. The non-transitory computer-readable storage medium according to claim 15, wherein the program further causes the at least one processor to:
aggregate the target entries to obtain a target vocabulary;
use, as a target user, a user at which the multi-path recall policy is targeted; and
push the target entries to a target client used by the target user.

19. The non-transitory computer-readable storage medium according to claim 15, wherein the program further causes the at least one processor to:
normalize, for the recalled vocabulary, the original scores of the entries in the vocabulary based on a minimum value and a maximum value of the original scores of the entries in the vocabulary to obtain the target scores of the entries in the vocabulary.

20. The non-transitory computer-readable storage medium according to claim 19, the program further causes the at least one processor to:
  determine, for the recalled vocabulary, the minimum value and the maximum value of the original scores of the entries in the vocabulary;
  determine, for each entry in the vocabulary, a first difference between the original score of the entry and the minimum value;
  determine a second difference between the maximum value and the minimum value; and
  determine a ratio of the first difference to the second difference as the target score of the entry.

* * * * *